United States Patent [19]

Jemt

[11] Patent Number: 5,964,645
[45] Date of Patent: Oct. 12, 1999

[54] WINDOW POLISHER

[75] Inventor: Thomas Jemt, Skogshyddan, Sweden

[73] Assignee: Douglas Industries, Inc., Louisville, Ky.

[21] Appl. No.: 08/836,619

[22] PCT Filed: Sep. 18, 1996

[86] PCT No.: PCT/US96/15015

§ 371 Date: Jul. 14, 1997

§ 102(e) Date: Jul. 14, 1997

[87] PCT Pub. No.: WO97/10925

PCT Pub. Date: Mar. 27, 1997

Related U.S. Application Data

[60] Provisional application No. 60/004,114, Sep. 21, 1995.

[51] Int. Cl.$^6$ ........................................................ B24B 1/00
[52] U.S. Cl. ............................ 451/41; 451/354; 451/359; 451/456; 451/388; 451/450
[58] Field of Search .................................. 451/354, 359, 451/434, 439, 388, 494, 456, 288, 449, 450, 921, 24; 483/33, 54, 55; 409/231; 269/21

[56] References Cited

U.S. PATENT DOCUMENTS

| | | |
|---|---|---|
| 1,094,361 | 4/1914 | Blevney . |
| 1,862,103 | 6/1932 | Stratford . |
| 2,804,733 | 9/1957 | Hurst . |
| 2,952,951 | 9/1960 | Simpson . |
| 2,993,311 | 7/1961 | West . |
| 3,053,063 | 9/1962 | Lilleberg . |
| 3,164,855 | 1/1965 | Hencken . |
| 3,418,675 | 12/1968 | Meguiar et al. . |
| 3,701,223 | 10/1972 | Cole et al. . |
| 4,502,174 | 3/1985 | Rones . |
| 4,511,605 | 4/1985 | McCartney . |
| 4,614,063 | 9/1986 | Crivaro et al. . |
| 4,724,567 | 2/1988 | Rones . |
| 4,733,502 | 3/1988 | Braun ........................................ 451/921 |
| 4,937,984 | 7/1990 | Taranto ...................................... 451/354 |
| 4,969,914 | 11/1990 | Ikegaya et al. . |
| 5,243,790 | 9/1993 | Gagne . |
| 5,289,605 | 3/1994 | Armbruster . |
| 5,509,848 | 4/1996 | Shimbara ................................... 451/24 |

FOREIGN PATENT DOCUMENTS

| | | |
|---|---|---|
| 0325424 | 7/1989 | European Pat. Off. . |
| 1104379 | 9/1959 | Germany . |
| 1239211 | 4/1967 | Germany . |
| 61-257778 | 11/1986 | Japan . |
| 5016065 | 1/1993 | Japan . |

*Primary Examiner*—Robert A. Rose
*Assistant Examiner*—George Nguyen
*Attorney, Agent, or Firm*—Theresa Camoriano

[57] ABSTRACT

An automatic polishing machine for polishing aircraft windows uses pressurized air to create a suction to hold the polishing unit on the aircraft, creates a suction to automatically pick up a polishing pad, which is impregnated with polishing compound, and, using a motor driving through a flexible drive joint, and using X and Y axis step motors, drives a polish head along the aircraft window, polishing the window.

20 Claims, 10 Drawing Sheets

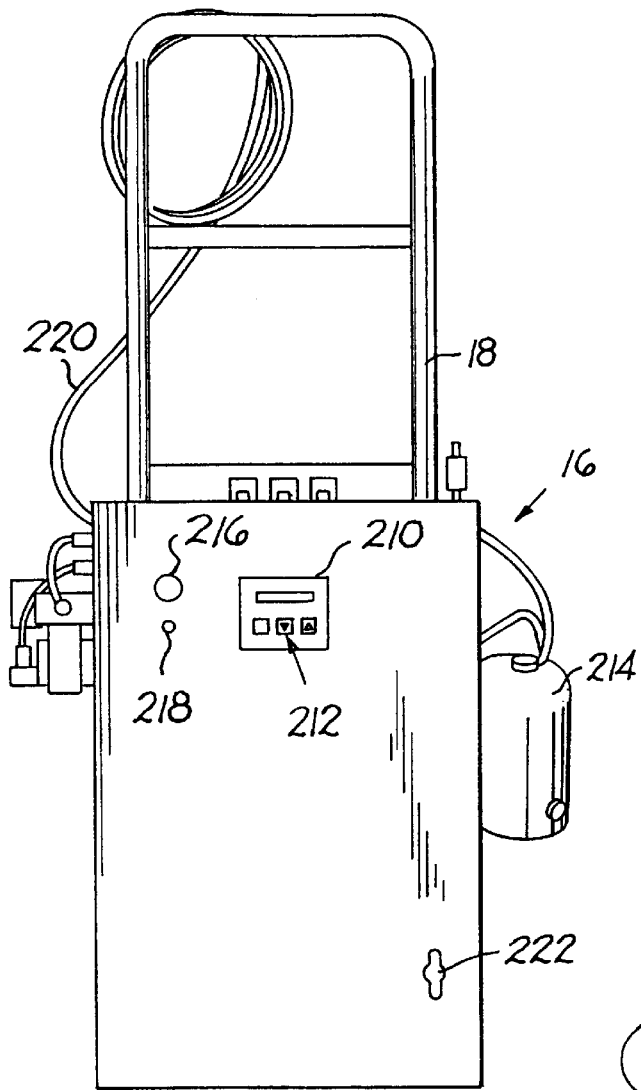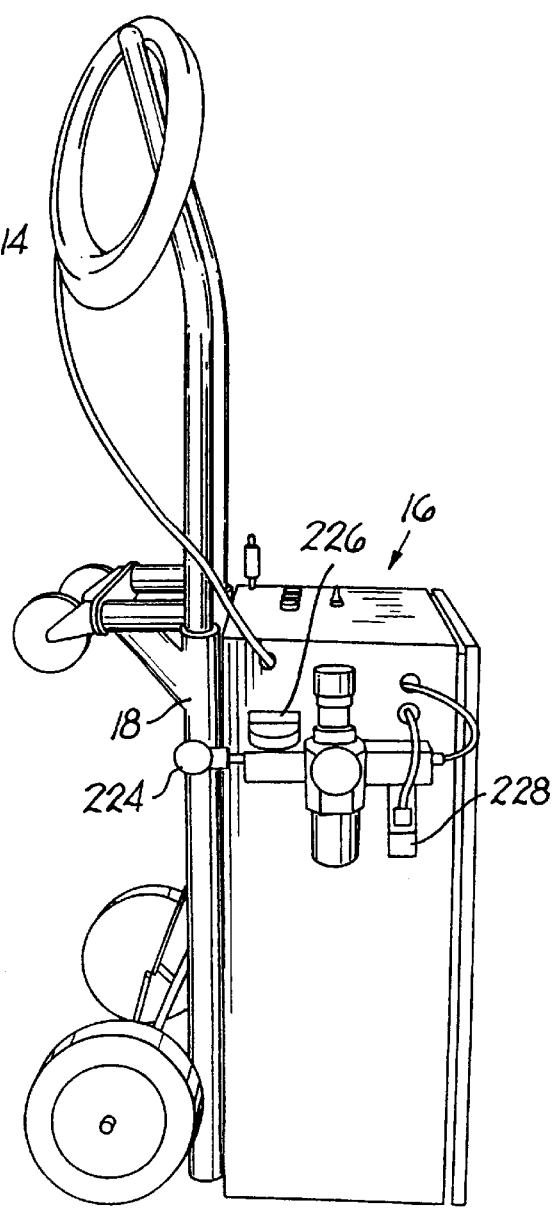
FIG.11
FIG.12

5,964,645

WINDOW POLISHER

BACKGROUND OF THE INVENTION

This application claims priority from U.S. Provisional Application Ser. No. 60/004,114, filed Sep. 21, 1995 and is a national filing of PCT/US96/15015, filed Sep. 18, 1996. The present invention relates to window polishers, and, in particular, to a device which can automatically polish aircraft windows.

Aircraft windows become scratched over a period of time, as they undergo something similar to a sand-blasting process when the aircraft flies at high speeds through dust-laden air. Rather than discarding the scratched windows, the windows are usually removed from the aircraft, are polished, and then are put back on the aircraft with a new seal. This is a very labor-intensive, time-consuming, and expensive process. In some cases, the labor costs are so high that the windows are shipped to a country with low labor costs and are then returned to be re-installed on the aircraft. However, this leaves the aircraft disabled during the period of time that the windows are being removed, polished, and replaced.

An attempt has been made to automate the polishing process prior to the present invention, so that the windows could automatically be polished while they remained on the aircraft, but this attempt failed. The machines simply did not work, for a number of reasons.

SUMMARY OF THE INVENTION

The present invention provides a machine which permits the polishing process to be automated, speeding up the process from approximately two hours per window to approximately ten or fifteen minutes per window. The process requires very little labor and permits the aircraft to be put back into use very quickly, thereby greatly reducing the out-of-pocket cost of the polishing process and the cost due to lost use of the aircraft.

The present invention provides a machine which makes few demands in terms of equipment that must be made available at the airport. It requires only electricity, a source of pressurized air, water to refill a water tank on the machine, and a supply of polish pad kits.

The present invention provides a polish head which automatically picks up and disposes of disposable polish pads by using a vacuum to pick up the pad and pressurized air to blow the pad away from the polish head.

The present invention provides a polish head which is rotated and moved over the surface of the window to polish the window but which is connected to its drive shaft by a flexible drive joint so that the polish head can pivot as necessary to match the contours of the aircraft window, which is curved, not planar. This is important to the proper functioning of the polisher.

The present invention provides special polish pads which are made up of a plurality of segments adhered to a backing, with the polish pads being impregnated with polishing compound which is released when water is squirted on the window and the polish head is passed over the window. This eliminates the need for pumping various types of polishing compounds to the machine. The segments are also spaced from each other so that water and air can pass completely around each segment as it is operating, thus helping to cool the window as it is being polished and to ensure good coverage of the polishing compound over the window.

The present invention provides suction feet which hold the machine onto the side of the aircraft. By pushing a button, the operator can change from having pressurized air flow out of the suction feet to having a suction at the suction feet. The pressurized air helps the operator slide the unit along the side of the aircraft to help locate it properly over the window, and the suction holds the unit on the side of the aircraft.

There are many other advantages of a machine made in accordance with the present invention, as will become obvious from reading the description which follows.

BRIEF DESCRIPTION OF THE DRAWINGS

FIG. 11 is a front view of the control unit for the polisher of FIG. 1;

FIG. 12 is a side view of the control unit of FIG. 11;

DESCRIPTION OF THE PREFERRED EMBODIMENT

Figure 1:
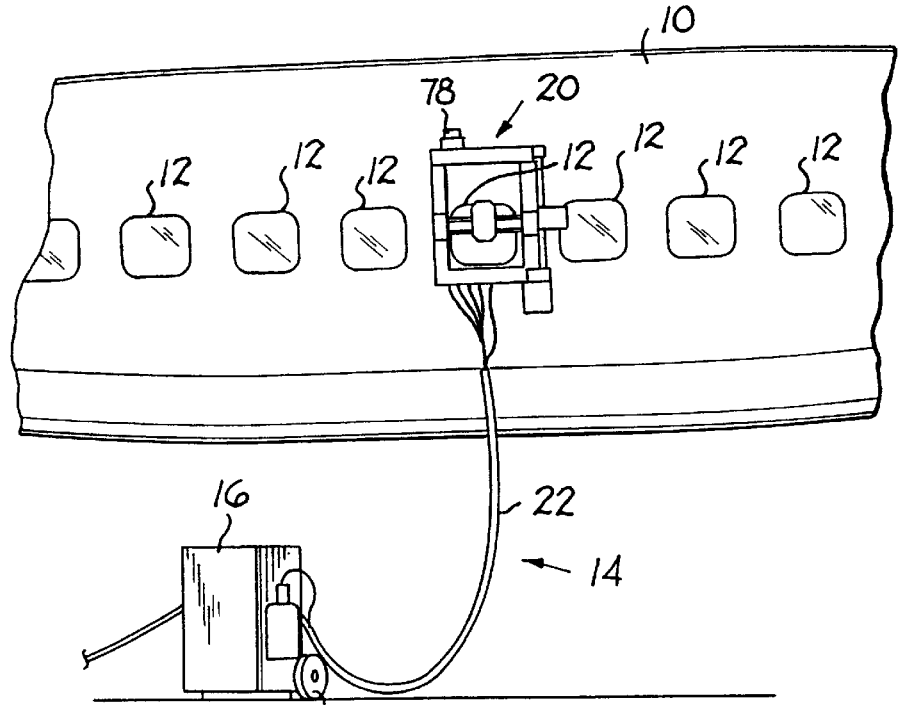
FIG. 1 is a view of an aircraft with a window polisher made in accordance with the present invention mounted on the aircraft for polishing the aircraft window.

FIG. 1 shows the side of an aircraft 10, having a plurality of windows 12. A window polishing machine 14, made in accordance with the present invention, is mounted on the side of the aircraft 10 over a window 12 for polishing the window 12. As shown in FIG. 1, the machine 14 includes a remote portion 16, which is wheeled around on the tarmac by a dolly 18, and a hanging portion 20, which hangs on the side of the aircraft 10. The hanging portion 20 may also be wheeled around on a dolly (not shown). There is a trunk line 22 extending from the remote unit 16 to the hanging unit 20, which includes electrical lines, pressurized air lines, and a water line, as will be described later.

Figure 2:
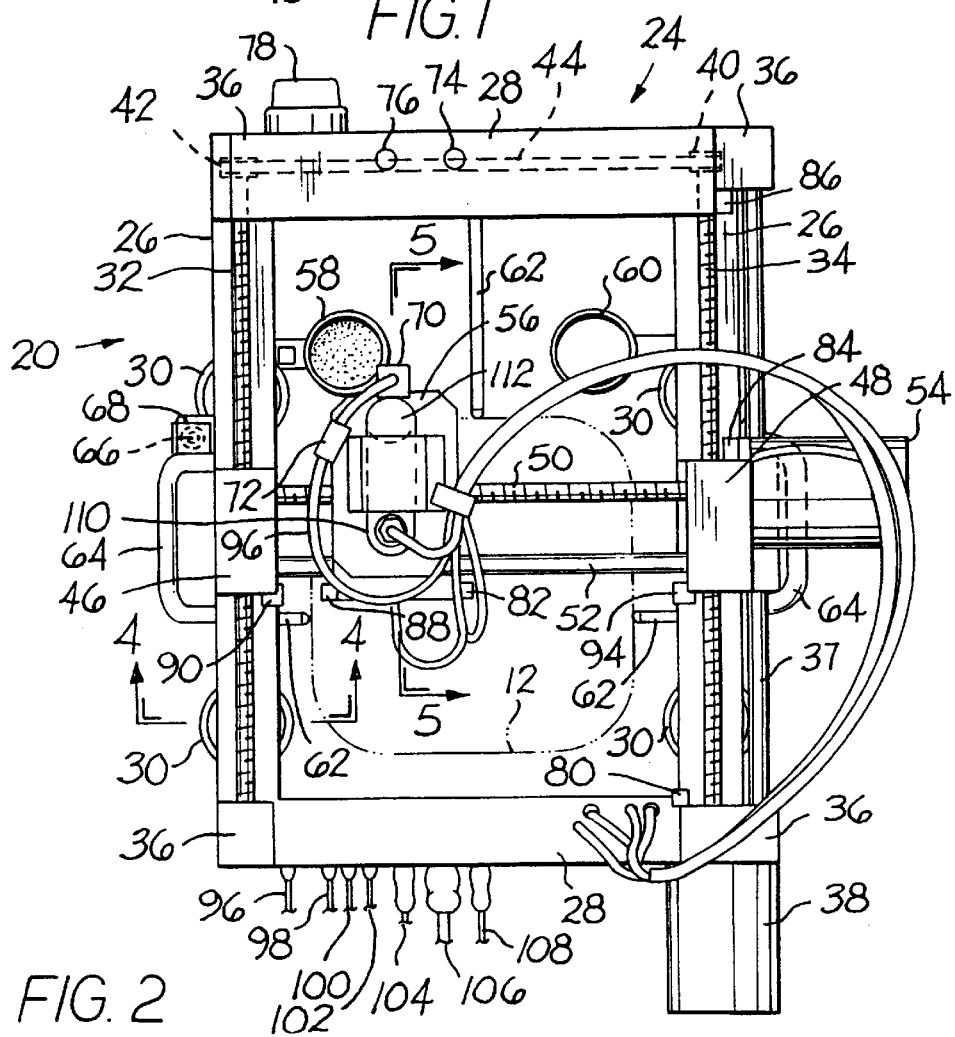
FIG. 2 is a top view of the portion of the polisher mounted on the window in FIG. 1, looking toward the aircraft.

FIG. 2 shows more of the details of the hanging unit 20 of the polishing machine 14. The hanging unit 20 includes a frame 24, which is made up of two parallel forward-to-back frame members 26 and two parallel left-to-right frame members 28 which are connected together to form the rectangular frame unit 24.

Four suction feet 30 are bolted onto the frame 24 and are directed downwardly, toward the aircraft 10. As will be described later, these suction feet adhere to the side of the aircraft by means of suction in order to hold the hanging unit 20 on the aircraft 10.

A left threaded rod 32 and a right threaded rod 34 are mounted on blocks 36, which are bolted to the frame 24. The left and right threaded rods 32, 34 are mounted directly over the forward-to-rear frame members 26. There is also a forward-to-rear unthreaded rod 37 on the right side of the frame 24. A Y-axis motor 38 is mounted on the forward right corner of the frame 24 and drives the right screw rod 34. As shown in phantom at the back end of the right screw rod 34 is a pulley 40, which carries a timing belt 44, which drives a left pulley 42, mounted on the end of the left screw rod 32, so that, as the Y-motor 38 turns the right screw rod 34, it causes the pulley 40 to rotate, which rotates the timing belt 44, which rotates the left rod 32, so that both rods 32, 34 rotate together. The Y-motor 38 is a step motor, in which each rotation of the motor is 1,000 steps, and an electrical controller, located at the remote portion 16, tells the Y-motor 38 how many steps to rotate, thereby closely controlling the motion of the rods 32, 34.

Left and right follower blocks 46, 48 are mounted on the threaded rods 32, 34, respectively, and move backward and forward on the rods 32, 34, following the threads on those rods as the rods rotate. The right follower block 48 is also mounted with a sliding fit over the unthreaded rod 37.

Two left-to-right rods 50, 52 are mounted between the follower blocks 46, 48 and travel forward and back along the frame 24 along with the follower blocks 46, 48. An X-motor 54 is mounted on the right follower block 48 and also travels with the follower blocks 46, 48. The rear left-to-right rod 50 has a threaded outer surface and is rotated by the X-motor. Again, the X-motor 54 is a step motor, the rotation of which is tightly controlled by the remote unit 16.

A polish head carrier block 56 is mounted on the left-to-right rods 50, 52 and moves left and right, following the threads of the threaded rod 50, as it is driven by the X-motor 54. Thus, the X-motor and Y-motor control the motion of the polish head carrier block 56 along a plane which is substantially parallel to the side of the aircraft.

Also seen in FIG. 2 are a polish kit receptacle 58 and a second receptacle 60, which are fixed to the frame 24 at an elevation above the bottom of the suction feet 30. Also fixed to the frame 24 are three window locating brackets 62, which are aligned with the left, right, and top edges of the window 12 to properly align the remote unit 16 with the window 12. Left and right handles 64 are fixed to the forward-to-rear frame members 26 for carrying the remote unit 20 by hand.

Several other features of the machine can be seen in FIG. 2. These features will be described in more detail later. There is a vacuum release button 66 near the left handle 64. This vacuum release button 66 is enclosed by a hinged cover 68. There is a water nozzle 70, and there is a water filter 72. There is a start button 74 and a stop/reset button 76. There is also a strobe light 78. The location of the polish head 110 and the air motor 112 which drives the polish head 110 can also be seen in FIG. 2.

FIG. 2 also shows several limit switches, which sense when the polish head carrier block 56 has reached the outer limits of travel. The first limit switch 80 is in the forward right corner of the frame 24, and its contact 82 is on the polish head carrier block 56. The second limit switch 84 is on the right follower block 48, and its contact 86 is in the right rear corner of the frame. The third limit switch 88 is located on the forward left corner of the polish head carrier block 56, and its contact 90 is on the frame near the left handle 64. The fourth limit switch 92 cannot be seen in this view, but it lies directly below the contact 82 for the first limit switch 80. The contact 94 for the fourth limit switch 92 is on the frame near the right handle 64.

Also shown in FIG. 2 are the lines which are enclosed in the trunk line 22, extending from the remote unit 16 to the hanging unit 20. These are a water line 96, a pressurized air line 98 to control the up-and-down movement of the polish head 110, a pressurized air line 100 to drive the air motor 112 which rotates the polish head 110, a pressurized air line 102 which goes to the suction feet 30 and the polish head 110, an electrical line 104, which controls the X-motor 54, an electrical control signal line 106, which controls the solenoid valves on the hanging unit 20, and an electrical line 108, which controls the Y-motor 38.

Figure 3:
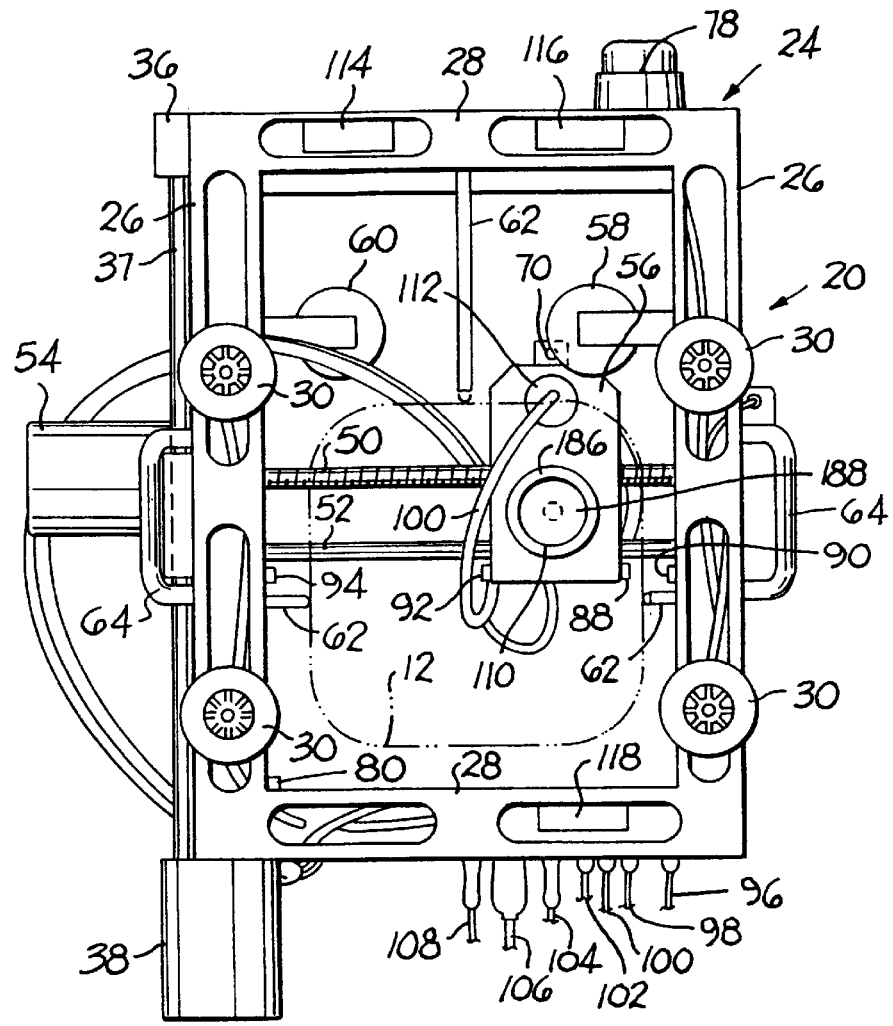
FIG. 3 is bottom view of the portion of the polisher of FIG. 2.

FIG. 3 shows a bottom view of the hanging unit 20. In addition to showing many of the parts that are seen in FIG. 2, FIG. 3 shows the bottom side of the suction feet 30, it shows the polish head 110 and the air motor 112 which drives the polish head 110. Also, in FIG. 3 are shown three venturi valves 114, 116, 118, which are solenoid valves which, in a first position, allow pressurized air to pass through, and, in a second position, use a venturi effect to create a suction from the pressurized air. Two of the venturi valves 114, 116 are used to create a suction or to provide pressurized air at the suction feet 30. The third venturi valve 118 provides suction or pressurized air at the polish head 110.

Figure 4:
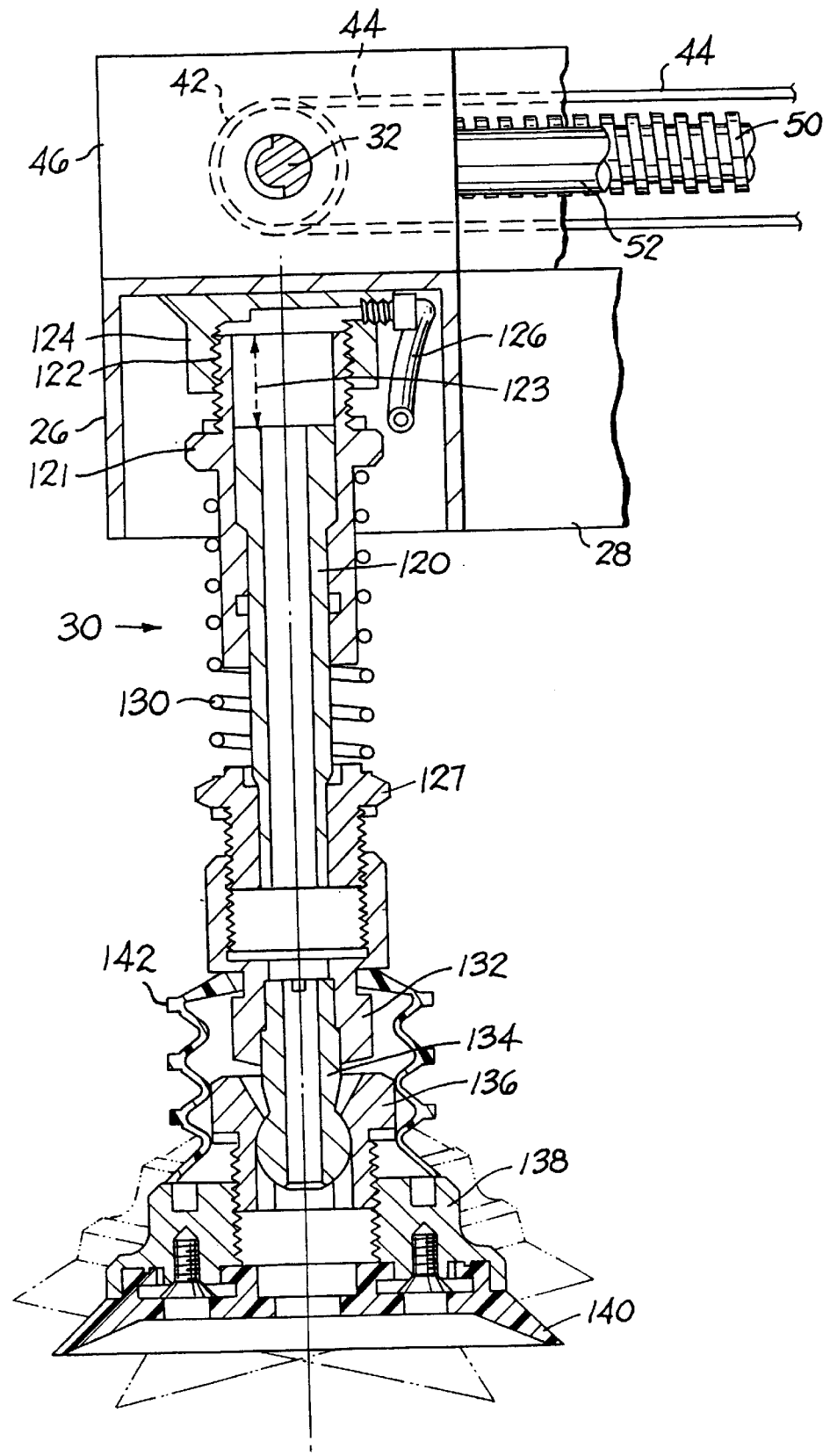
FIG. 4 is a side sectional view of one of the suction feet of the polisher of FIG. 2.

FIG. 4 is a detailed view of the left front suction foot 30. The other suction feet 30 are identical to this foot, except that they are mounted on different parts of the frame 24 and may have different air lines extending to them.

The left front suction foot 30 includes a hollow shaft 120, which slides up and down inside of an upper sleeve 121 as shown by the arrow 123. The upper sleeve 121 has threads 122 at its top end, which are threaded into a nut 124, which is bolted to the underside of the left frame 26. The shaft 120 is stopped in its upward travel by the nut 124, and it is stopped in its downward travel by the sleeve 121, because the interior of the sleeve 121 has a reduced diameter portion beyond which the enlarged diameter upper portion of the foot shaft 120 cannot pass. An air line 126 is connected to the nut 124, and communicates with the interior of the shaft 120.

A lower sleeve 127 is fixed to the bottom portion of the foot shaft 120, and a spring 130 extends between the upper sleeve 121 and the lower sleeve 127 and serves as a shock absorber. The outer surface of the lower sleeve 127 is threaded, and a connector 132 is threaded onto the lower sleeve 127. The connector 132 is fixed to the upper portion 134 of a ball joint, and the lower portion 136 of the ball joint is threaded onto a foot 138. A flexible suction cup 140 is mounted onto the foot 138. There is a fluid path through the center of the foot shaft 120, through the upper and lower portions 134, 136 of the ball joint, through the foot 138, and through the soft cup 140, which permits air to flow through. There is a soft, flexible cover 142 over the ball joint parts 134, 136 to protect the joint.

If pressurized air passes through the air line 126 to the soft cup 140, then the suction foot 30 is provided with a layer of air, which helps it glide smoothly over the surface of the aircraft 10 to help locate it properly over the window 12. If a vacuum is drawn through the air line 126, then it pulls a suction from the soft cup 140, which provides the pressure differential needed to hold the hanging portion 20 of the machine 14 on the aircraft 10. Actually, the embodiment shown here can be held on the aircraft 10 if only one of the four suction feet 30 is working properly.

Figure 5:
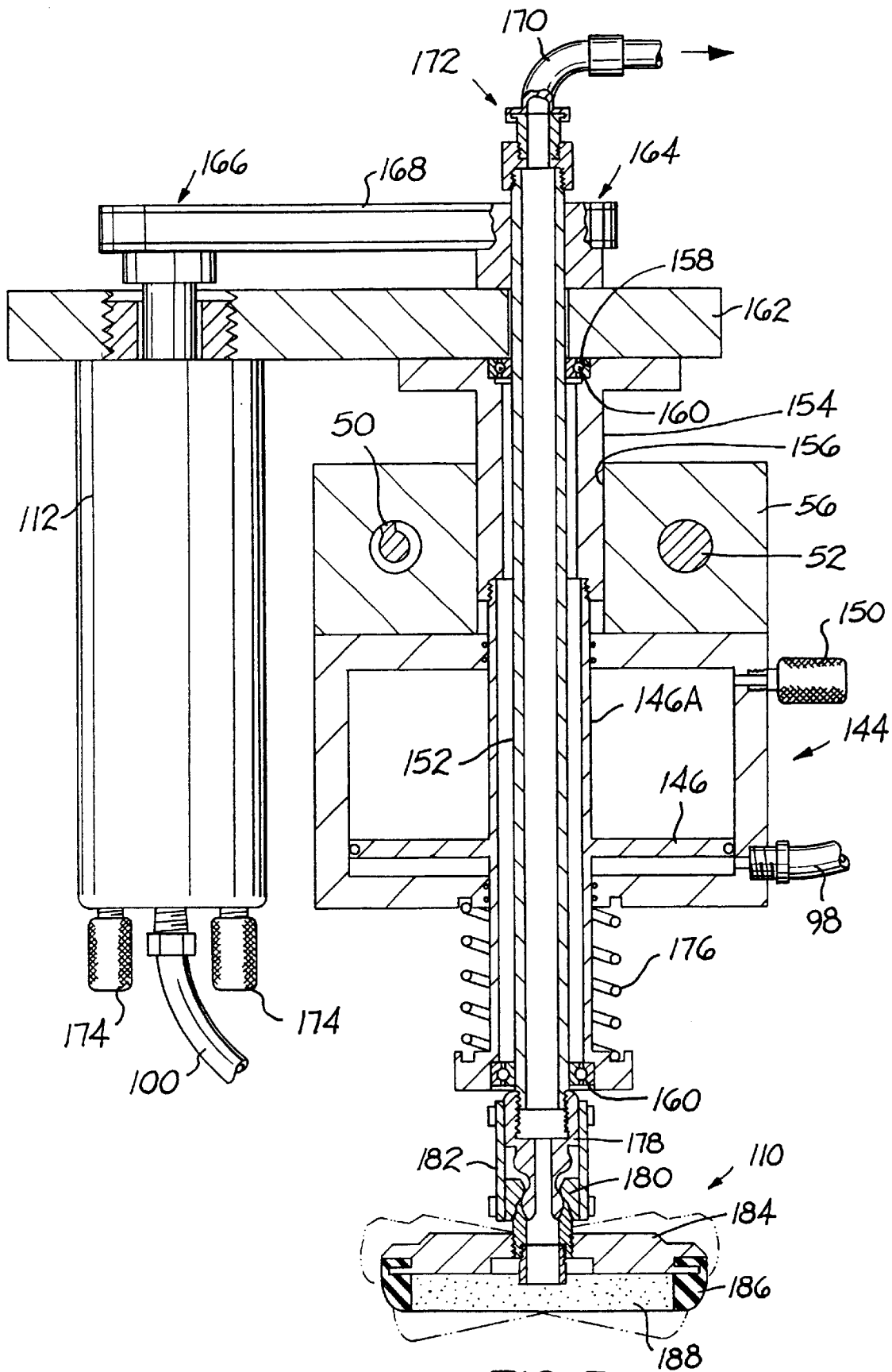
FIG. 5 is a side sectional view of the polish head of the machine FIG. 2.

FIG. 5 shows the polish head 110, which is supported on the polish head carrier block 56 described earlier. A cylinder 144 is fixed to the polish head support block 56. A piston 146 fits inside the cylinder 144 and travels up and down in the cylinder 144, depending upon the pressures in the chambers above and below the piston 146. The upper chamber is vented to atmosphere through the vent 150, and the lower chamber is connected to an air line 98. The piston 146 includes a tubular bracket 146A, and inside the tubular bracket 146A is the polish head shaft 152. The tubular bracket 146A and the polish head shaft 152 travel up and down relative to the carrier block 56 as the piston 146 travels up and down in its cylinder 144.

The top of the tubular bracket 146A is threaded onto a cylindrical bracket 154, which slides up and down in a vertical, cylindrical hole 156 of the block 56. The cylindrical bracket 154 has an enlarged top portion, which includes a recess 158 into which is pressed a bearing 160, which supports the polish head shaft 152. The flat top surface of the cylindrical bracket 154 is fastened to a motor support 162, which supports the air motor 112. The motor support 162 also supports the pulleys 164, 166 and the drive belt 168, through which the air motor 112 drives the polish head shaft 152. An air line 170 is connected to the top of the hollow polish head shaft 152 through a connector 172, which allows the shaft 152 to rotate while the air line 170 remains stationary, still maintaining an open conduit from the air line 170, through the shaft 152.

There is also an air line 100 to the air motor 112, and there are two vents 174 from the air motor 112.

The lower portion of the piston bracket 146A is enlarged and houses a second bearing 160, which supports the lower end of the polish head shaft 152. There is also a spring 176, located between the cylinder 144 and the enlarged portion of the piston bracket 146A. This spring 176 provides the force which pushes the polish head 110 down, to polish the aircraft window 12.

The bottom of the polish head shaft 152 is threaded onto the top portion 178 of a ball joint, and the bottom portion 180 of the ball joint is threaded onto the polish head 110. There is also a piece of flexible hose 182 which is fastened on top to the top 178 of the ball joint and is fastened on the bottom to the bottom 180 of the ball joint. This hose 182 provides a flexible drive between the top and the bottom of the ball joint, so that the resulting joint provides a flexible drive joint, which drives the polish head 110, allows the polish head 110 to pivot in all directions, and provides an air passage from the drive shaft 152 through the polish head 110. Phantom lines show some of the directions in which the polish head 110 can pivot about the flexible drive joint, while still being rotated by the drive shaft 152 and still permitting air flow through the joint.

The polish head 110 includes a rigid back portion 184 onto which is connected a flexible rim 186. Located across the inside diameter of the flexible rim 186 is a porous plate 188. This porous plate 188 is preferably made of a man-made rock with pores in it, so that the air pressure or the vacuum from the air line 170 reaches the outer face of the plate 188 in order to hold the polish pad on the polish head 110 or to blow the polish pad off the polish head.

Figure 5A:
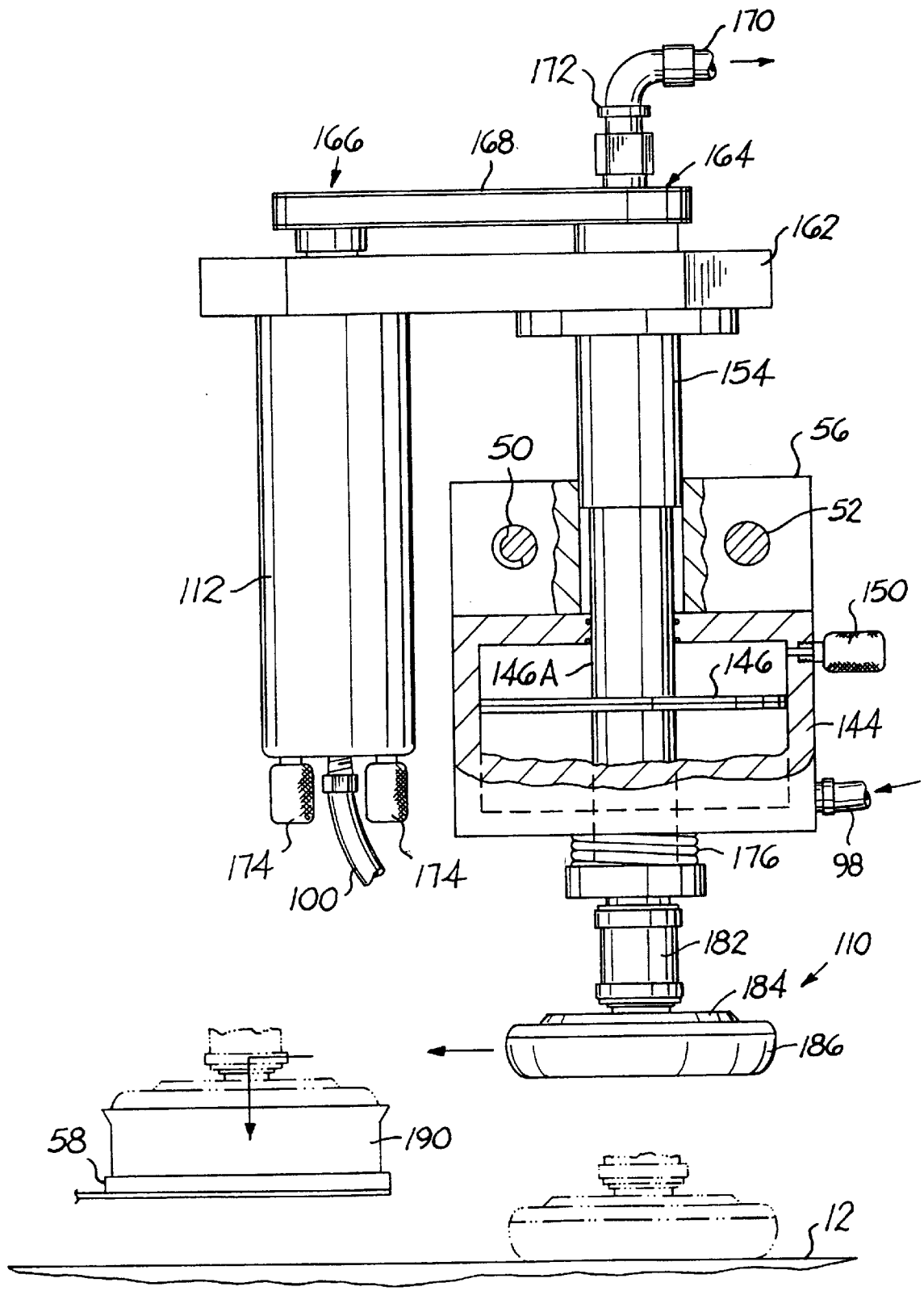
FIG. 5A is a side view of the polish head of the machine of FIG. 2, showing in phantom how the polish head moves to pick up a polish pad and then moves down to the surface of the window.

FIG. 5A shows the same polish head 110 as FIG. 5, except, in this view, the piston 146 has moved upwardly in the cylinder 144, due to air pressure in the line 98. This retracts the polish head 110 so the polish head 110 can move over the polish pad kit 190 to pick up a polish pad (shown in later figures). In order to move the polish head 110 over the kit 190, the X-motor 54 and the Y-motor 38 rotate their respective shafts, moving the polish head carrier block 56 directly over the kit 190. Then, the air pressure in the line 98 is released, thereby lowering the polish head 110 down into the kit 190 to pick up the polish pad. Then, the line 98 is again pressurized, retracting the polish head 110, and then the X-motor 54 and the Y-motor 38 drive the polish head 110 back over the window. The air pressure in the line 98 is again reduced, extending the polish head 110 to the position shown in phantom in FIG. 5A, where it is pressed against the window 12 by the spring 176.

Figure 6:
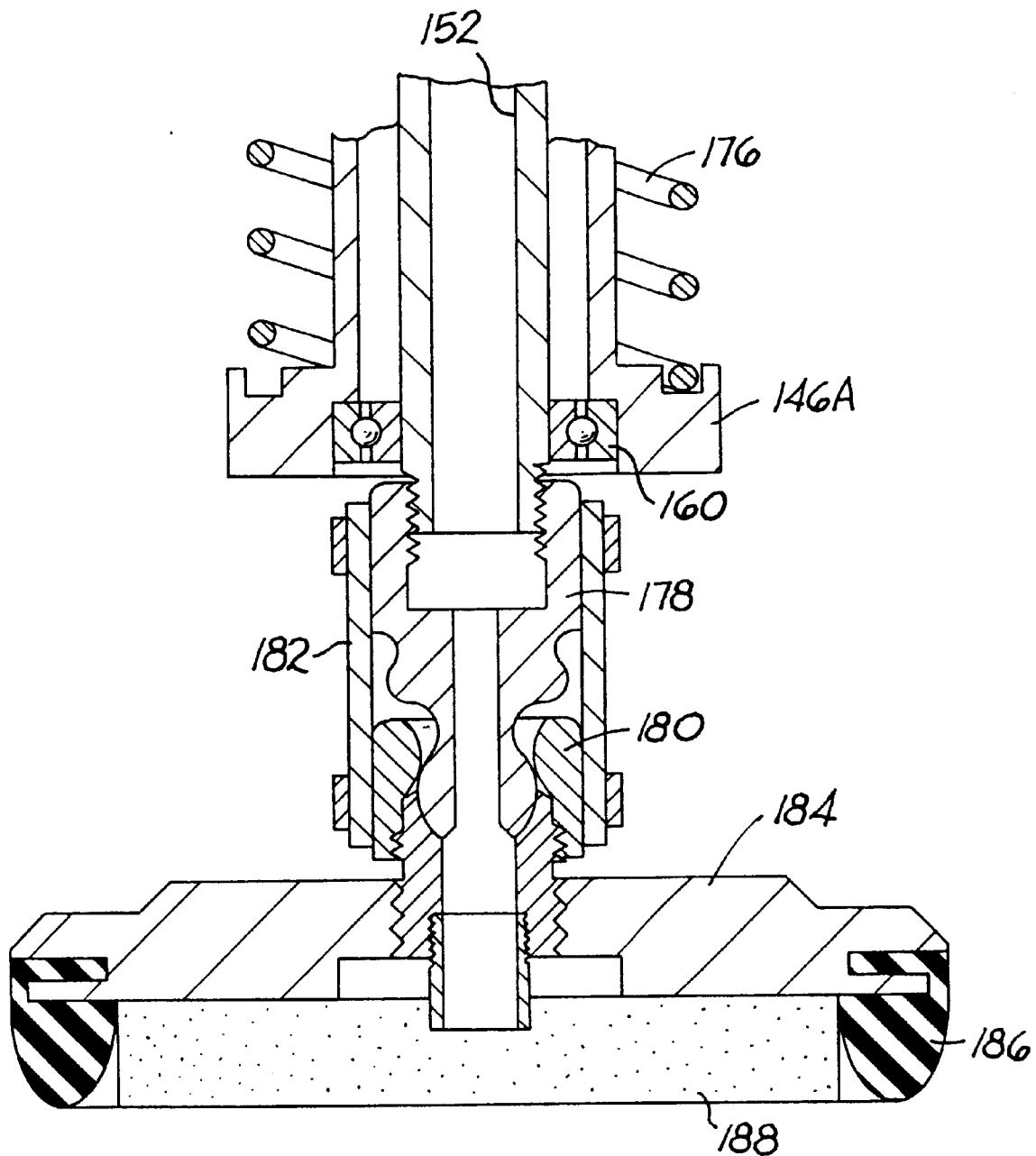
FIG. 6 is an enlarged side sectional view of the polish head of FIG. 5.

FIG. 6 is an enlarged view of the bottom portion of FIG. 5, showing the polish head 110 and the flexible drive joint.

Figure 7:
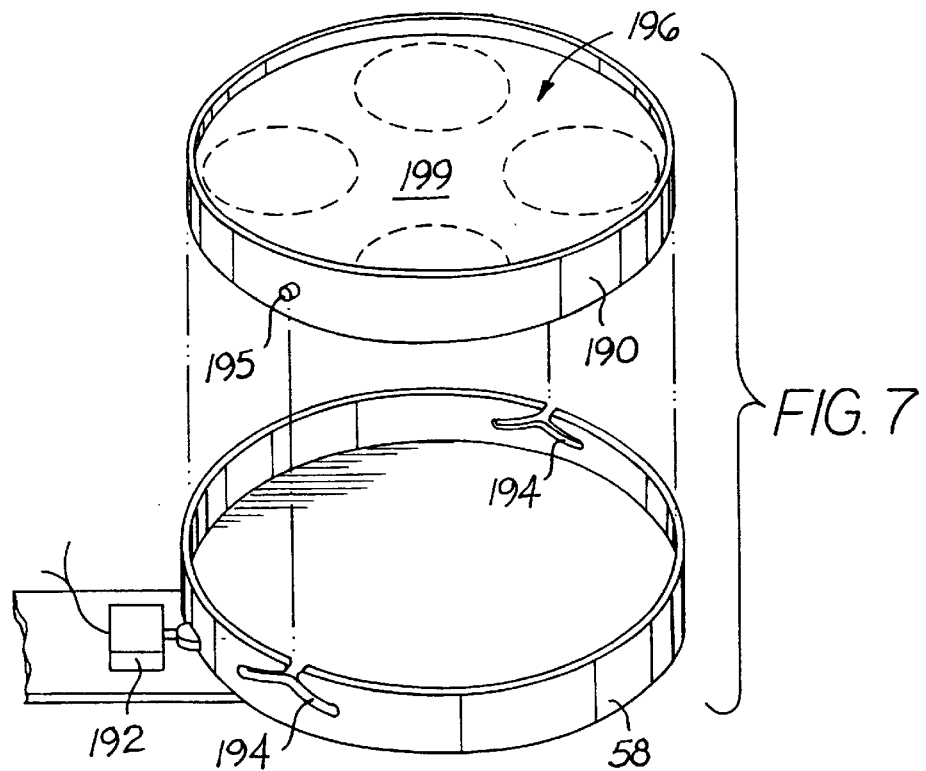
FIG. 7 is an exploded perspective view of the polish pad kit and the receptacle which receives the polish pad kit of the machine of FIG. 1.
Figure 8:
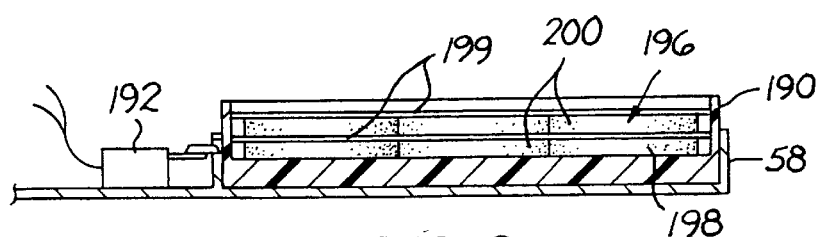
FIG. 8 is a side sectional view of the kit and receptacle of FIG. 7.
Figure 9:
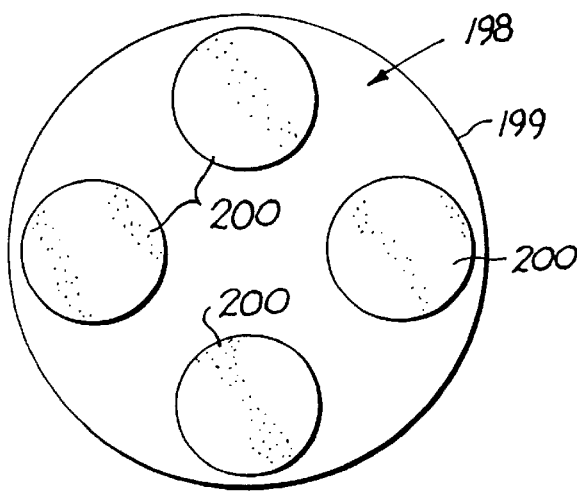
FIG. 9 is a bottom view of one of the polish pads of FIG. 7.

FIGS. 7 and 8 show the polish kit receptacle 58, the polish kit 190, and the sensor 192, which senses whether there is a polish kit 190 in the receptacle 58. The polish kit receptacle 58 has opposed slots 194, and the kit 190 has opposed ears 195, which are received in the slots 194 to hold the kit 190 in the receptacle 58. To put a kit 190 into a receptacle 58, the opposed ears 195 must be aligned with the top openings of their respective slots 194, and then the kit 190 is pushed down and twisted clockwise or counterclockwise, drawing the kit 190 down into the receptacle 58, and retaining it in place. When the kit 190 is in position, the sensor 192 senses its presence in the receptacle 58.

In each kit 190 are at least two polish pads 196, 198. Each polish pad 198 has a circular, flat, solid back member 199 and a plurality of pad segments 200, which are adhered to the face of the back member 199 with spaces between the pad segments 200 to permit water and air to pass between the pad segments 200. The pad segments 200 are preferably made from "Finesse-It Buffing Pad" material, which is sold by 3M International. The upper pad 196 is actually the finishing pad, which will be used last, and the lower pad 198 is the pad which will be used first. The lower pad 198 has been impregnated with a rubbing compound which has been allowed to dry. This compound is preferably ERR-Bee 103 fine white, which is manufactured by AB ERR-BEE in Sweden. The upper pad 196 has been impregnated with a finer, finishing compound which has been allowed to dry. The finishing compound is preferably 3M Finesse-It 09639, sold by 3M International. The backing plate 199 may be made of a metal disk or a cardboard disk. The kits 190 will be provided to the customer in a sealed condition to be sure that the polish and finishing compounds retain their properties until the polish pads are used. When water is squirted onto the aircraft window and the polish pads 196, 198 move over the surface of the window, the polish compound and finish compounds are dissolved, making them available for use in automatically polishing the window.

Figure 10:
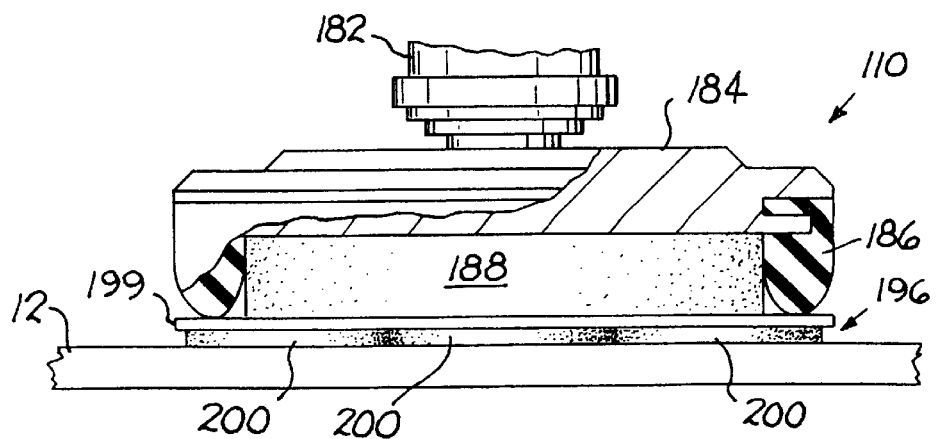
FIG. 10 is a side view partially in section of the polish head and polish pad polishing a window.

FIG. 10 shows the polish head 110 with a polish pad 196 in place on the face of the polish head 110 and pressing against a window. It can be seen here that the outside diameter of the polish pad 196 is approximately the same as the outside diameter of the flexible rim 186. The vacuum in the line 170 pulls a vacuum through the porous plate 188, and causes the pad 196 to adhere to the polish head 110 as the polish head 110 rotates and travels along the surface of the window.

FIGS. 11 and 12 show the remote unit 16. The remote unit 16 is carried on a dolly 18. Inside the remote unit 16 is a computer (not shown), which controls the operation of the machine 14. There is a window 210 on the front of the remote unit 16, through which a display can be seen, and there are touch pads 212, which allow an operator to control the computer. The remote unit 16 carries a water tank 214, and it carries a number of valves, which will be described in detail later. On the front of the remote unit 16 are an on/off switch 216 and an indicator light 218 for the power supply. The power supply cord 220 is shown. There is a lock 222, which locks the remote unit 16 closed, keeping people out of the inside of the box.

Pressurized air is usually available at an airport, and the pressurized air line is just connected to the air inlet 224 of the remote unit 16. There is a manual valve 226, for turning the air on and off manually at the remote unit 16, and there is a pressure switch 228, which senses whether there is sufficient air pressure at the machine and which shuts the machine down if there is not sufficient air pressure. Above the water tank 214, and not shown in these drawings, are an emergency stop button, an alarm, and a water filter, to filter water leaving the water tank 214.

Figure 13:
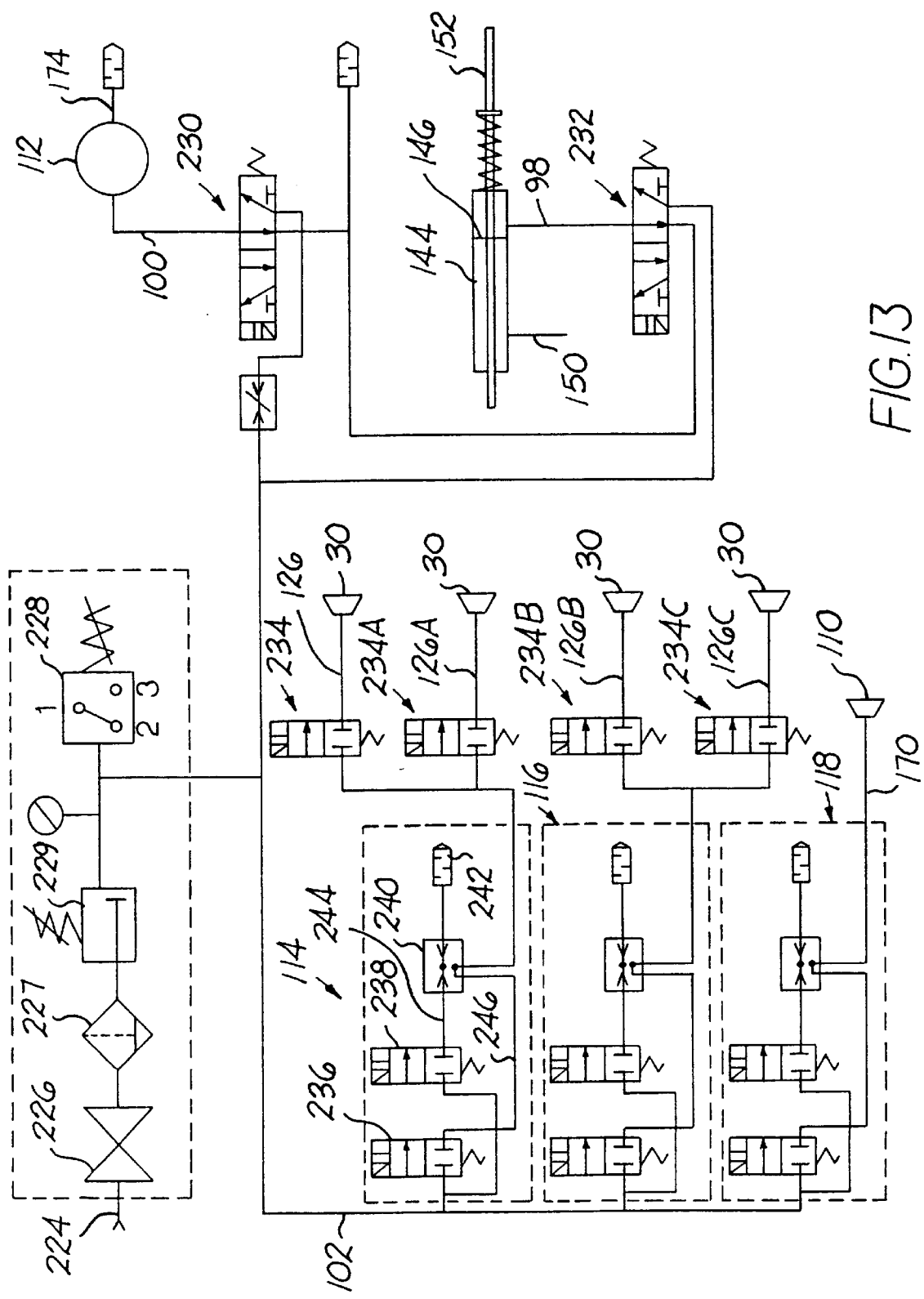
FIG. 13 is a schematic of the pneumatic system of the machine of FIG. 1.

FIG. 13 shows a schematic view of the pressurized air system. The pressurized air inlet 224 to the remote unit 16, the manual valve 226, drain 227, pressure switch 228 and pressure regulator 229 are shown at the top left of the schematic diagram. The three air lines in the trunk line 22 going from the remote unit 16 to the hanging unit 20, which are shown in FIG. 2, are reflected in this diagram. They are the pressurized air line 98, which goes to the polish head cylinder 144 to raise and lower the polish head 110; the pressurized air line 100, which goes to the air motor 112, which drives the polish head drive shaft 152; and the pressurized air line 102, which communicates with the suction feet 30 and the polish head 110.

The solenoid valve 230 in the line 100 to the air motor 112 and the valve 232 in the line 98 to the cylinder 144 are located in the remote unit 16. There are also solenoid valves 234 and 234A–C in the air lines 126 and 126A–C to the suction feet 30. These solenoid valves 234 are located on the hanging unit 20 and are controlled by the central processor at the remote unit 16. These valves are biased in the closed position, so they will close if a signal is lost from the central processor. If there is a suction in the lines 126 and the valves 234 are closed, they will hold the suction in the suction feet 30 for a long period of time, even if there is a problem with the air pressure lines to the machine. This gives the operator plenty of time to take down the hanging unit 20 or remedy the problem well before the hanging unit 20 falls off of the aircraft.

The venturi valves 114, 116, and 118 were referred to earlier. They are located on the hanging unit 20 and control whether pressurized air or a vacuum goes to the end point. The valve 114 controls the air lines 126 and 126A to the left suction feet 30, and the valve 116 controls the air lines 126B and 126C to the right suction feet 30. The valve 118 controls the air line 170 to the polish head 110. Each of these venturi valves 114, 116, 118 is shown schematically as being made up of several parts—a first valve 236, a second valve 238, a venturi 240, a vent to atmosphere 242, a first path 244, and a second path 246.

If both the first valve 236 and the second valve 238 are closed, then nothing goes to the end point—neither pressurized air nor a vacuum. If the first valve 236 is open and the second valve 238 is closed, then pressurized air goes through the path 246 to the end point, providing pressurized air to the feet 30 or to the polish head 110. If the first valve 236 is moved to its third position and the second valve 238 is opened, then pressurized air does not pass through the first valve 236. Instead, it goes through the second valve, through the venturi 240 to atmosphere 242. When pressurized air goes through the venturi 240, it creates a vacuum, which pulls air from the end point.

The valves 114, 116, which control whether the suction feet 30 receive pressurized air or a vacuum, are controlled in part by the vacuum release button 66. When the operator presses that button 66, it causes the first valve 236 to open, sending pressurized air to the feet. This provides an air cushion which helps the operator slide the hanging unit 20 along the side of the aircraft until it is properly aligned with the window. Then, the operator stops pushing the vacuum release button 66, and the central processor at the remote unit 16 shifts the valves 236 and 238 to provide a vacuum at the feet 30.

The venturi valve 118, which controls whether the polish head blows out air to get rid of a polish pad or pulls a vacuum to pick up and hold a polish pad, is controlled by the central processor at the remote unit.

Figure 14:
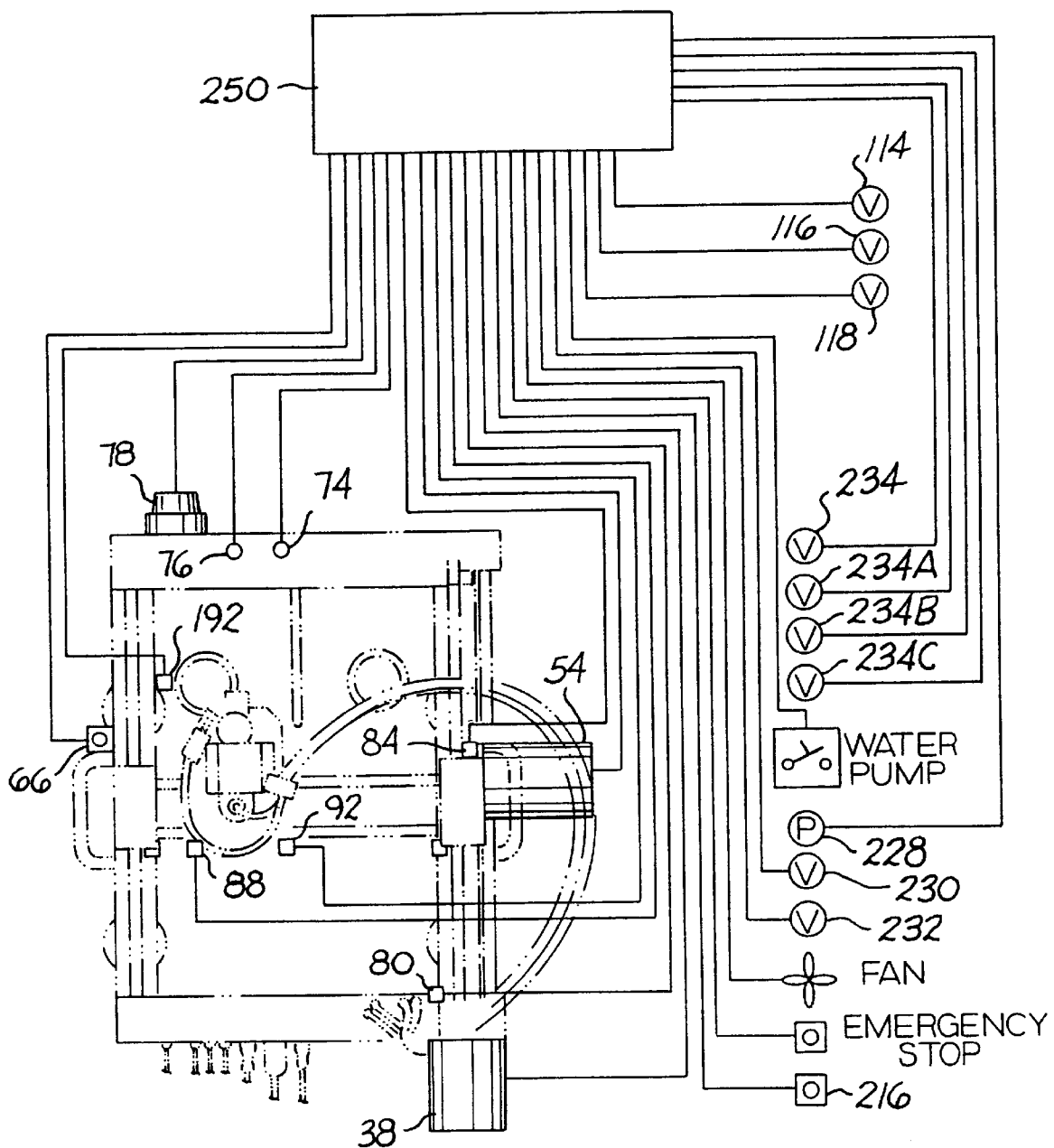
FIG. 14 is an electrical schematic of the machine of FIG. 1.

FIG. 14 is a schematic of the electrical control system, showing what signals the central processor 250 at the remote unit 16 receives and what it controls. It can be seen in this schematic that the central processor 250 in the remote unit 16 has electrical connections with many different parts of the machine 14. It receives a signal from the vacuum release button 66, which causes it to send signals to the venturi valves 114, 116 for the suction feet 30. It receives a signal from the sensor 192, which tells the central controller 250 whether there is a polish pad kit 190 in the receptacle 58, and, if there is not a polish pad kit 190 present, the controller 250 will not allow the polish head 110 to travel along its path to polish the window.

The controller 250 sends signals to the strobe light 78 and to the sound alarm mounted on the remote unit 16 to let the operator know when the polishing sequence is finished and to let the operator know if there is a problem with the machine. The controller receives signals from the stop/reset button 76 and from the start button 74 on the hanging unit 20. The controller receives signals from the limit switches 80, 84, 88, and 92, which tell the controller that the polish head has reached the outer limits of operation. This is used to give the controller a starting point from which to operate, and it tells the controller if something has gone wrong and the polish head has gone beyond where it is supposed to be. In the latter case, the controller 250 would stop the machine and sound the alarm and turn on the strobe light 78.

The controller 250 communicates with the X and Y step motors 54 and 38, giving them precise instructions to move the polish head support block 56 along a plane substantially parallel to the surface of the aircraft.

The controller 250 communicates with the on/off switch 216 on the remote unit 16, with the emergency stop button on the remote unit, and with the fan on the remote unit which cools the controller 250.

The central processor 250 controls the solenoid valve 232 which provides pressurized air to move the polish head up and down. It also controls the solenoid valve 230 which provides pressurized air to operate the air motor which causes the polish head 110 to rotate.

The central processor 250 communicates with a pressure switch 228, which tells the processor 250 when the air pressure is low, and this causes the central processor 250 to stop the machine and sound the alarm and light up the strobe 78. If there is a signal to the central processor 250 from the pressure switch 228 indicating a problem, the central processor will signal the valves 234 and 234A–C, which will close in order to maintain a vacuum in the suction feet 30.

The central processor turns the water pump on and off to provide water from the tank 214 to squirt on the window. There is also a sensor in the water tank 214, which tells the central processor 250 when the water level is low, and the central processor 250 again signals the operator that the water supply must be replenished.

The central processor 250 also sends signals to the venturi valves 114, 116, and 118 to control the air flow to the vacuum feet 30 and to the polish head 110.

Normal operation of the machine is as follows:

The remote portion 16 and the hanging portion 20 of the machine 14 are rolled out to the aircraft 10 on dollies. The remote unit 16 is connected to a power source and to a pressurized air source. The operator turns on the main on/off switch 216 on the remote unit 16. The central processor 250 signals the step motors 38, 54 to lock, so they will not move. Then the operator looks at the display through the window 210 and pushes the buttons 212 to select the type of aircraft window to be polished. For example, the operator will select "Boeing 747" and then press "enter".

The computer signals the valves 114, 116, 118 and 232 to create a suction in the suction feet 30, to create a suction in the polish head 110, and to retract the polish head 110. The vacuum release light in the vacuum release button 66 comes on.

Then, the operator pushes the vacuum release button 66, which switches the venturi valves 114, 116, 118 to pressure, and picks up the hanging unit 20 by the handles 64. Then, the operator lifts the hanging unit 20 up to the side of the aircraft 10, placing the hanging unit 20 on top of a window 12, and uses the window locating brackets 62 to properly align the hanging unit 20 with the window 12. The operator continues to push the vacuum release button 66 while aligning the unit 20 with the window 12, as this provides a cushion of air through the feet 30, which helps the hanging unit 20 slide over the surface of the aircraft. Once the hanging unit 20 is properly aligned with the window 12, the operator releases the button 66, causing a vacuum to be pulled through the suction feet 30, thereby causing the hanging unit 20 to adhere to the aircraft 10 due to the suction in the feet 30. As was explained earlier, there are two venturi valves 114, 116 which control the suction to the feet, and the unit 20 will hang on the aircraft even if only one of the feet 30 has suction.

The operator opens a polish pad kit 190 and places the open kit 190 in the receptacle 58. With the hanging unit 20 mounted on top of the window 12, the operator then pushes the start button 74, which signals the central processor 250 to start the operating sequence. The processor 250 then tells the step motors 38, 54 to drive the polish head carrier block to the left rear corner of the frame 24. The third limit switch 88 tells the processor 250 when it reaches the contact 90, indicating it has moved all the way to the left, and the second limit switch 84 tells the processor 250 when it reaches the contact 86, indicating it has moved all the way to the rear of the frame 24. The processor 250 designates this position as the "zero" position.

The processor 250 then signals the step motors 38, 54 to move the polish head support block 56 to a point directly over the polish pad kit 190, and it signals the valve 232 to lower the polish head. It also signals the venturi valve 118 to switch to a vacuum, so the uppermost polish pad 196 (the finishing pad impregnated with a fine-grain finishing compound) is sucked onto the polish head 110.

The processor 250 then signals the valve 232 to retract the polish head, and it signals the step motors 38, 54 to move the polish head carrier block 56 directly over the second receptacle 60. The processor 250 then signals the valve 232 to extend the polish head, and it signals the venturi 118 to blow air out the polish head 110, depositing the upper pad 196 into the second receptacle 60.

The processor 250 then sends the polish head 110 over to the kit 190 to pick up the second polish pad 198, which is impregnated with a coarser-grain polishing compound. Then, the processor 250 directs the step motors 38, 54 to move the polish head carrier block 56 over the center of the window. The processor turns on the water pump or opens a valve in the water line, which sends water from the tank 214 through the water line 96 to the water nozzle 70 to squirt on the window. The processor directs the motors 38, 54 to move the polish head support block 56 down the middle of the window to the bottom of the window, while water is squirting out the nozzle 70 to wet the window.

Then, the central processor vents the cylinder valve 232 to atmosphere, venting the lower chamber of the cylinder in order to extend the polish head 110 to the window, and opens the air motor valve 230 to turn on the air motor, causing the polish head to rotate. The central processor 250 then directs the motors 38, 54 to drive the polish head along a predetermined path in order to cover the entire window, and periodically squirts water on the window as the polishing process proceeds.

Once the pad 198, which was impregnated with a polishing compound, has completed its path, the processor 250 retracts the polish head, places the polish head over the kit 190, and causes air to blow out the polish head 110 to deposit the used pad 198 in the kit 190.

Then, the polish head goes over to the second receptacle 60 and picks up the other pad 196, which has been impregnated with a fine-grain finishing compound. The sequence is repeated, with water squirting and the polish head rotating as it travels a predetermined path over the window. Again, the used polish pad is deposited into the kit 190.

Then, the polish head is retracted, and the motor 38 moves the polish head 110 forward a bit. The central processor 250 then turns on the alarm and the strobe 78 and the display in the window of the remote unit 16 says "program finished". This signals the operator that it is time to move the hanging unit 20 to the next window.

The operator presses the stop button 76, pushes down the vacuum release button 66, and moves the hanging unit 20 to the next window. Then the operator removes the used polish pad kit 190 from the machine, and opens and installs a new polish pad kit 190. Then the operator pushes the start button 74, and the process repeats.

In this manner, it is possible for a single operator to operate several machines at once in order to quickly polish all the windows of the aircraft.

It will be obvious to those skilled in the art that modifications may be made to the embodiment of the invention described above without departing from the scope of the present invention.

What is claimed is:

1. A machine for automatically polishing aircraft windows, comprising:

a polish head mounting block defining a vertical direction;

a polish head shaft mounted on said polish head mounting block, said polish head shaft having a hollow interior and an upper end and a lower end;

a motor which rotates said polish head shaft relative to said polish head mounting block;

a flexible drive joint mounted at the lower end of said polish head shaft;

a polish head mounted on said flexible drive joint so that said polish head is rotationally driven by said polish head shaft and can pivot relative to said shaft;

said flexible drive joint having a hollow interior which communicates with the hollow interior of said polish head shaft; and said polish head being permeable, so that pressurized air passing through the hollow interior of said polish head shaft passes through said flexible drive joint and through said permeable polish head, and so that, if a vacuum is drawn on the interior of said polish head shaft, it pulls a suction through said polish head and through said flexible drive joint.

2. A machine as recited in claim 1, and further comprising a piston and cylinder arrangement mounted on said polish head mounting block; wherein said polish head shaft is mounted so as to move up and down relative to said polish head mounting block as said piston moves relative to said cylinder.

3. A machine as recited in claim 2, and further comprising a polish pad held on said polish head by a suction drawn through said polish head drive shaft, said polish pad having approximately the same diameter as said polish head.

4. A machine as recited in claim 3, wherein said polish pad is impregnated with a polishing compound which dissolves in water.

5. A machine as recited in claim 1, and further comprising a spray nozzle mounted on said polish head support block for spraying water onto the aircraft window to be polished by the polish head.

6. A machine as recited in claim 1, and further comprising a spring between said piston cylinder arrangement and said polish head, for providing a spring force to press said polish head against the aircraft window.

7. A machine as recited in claim 1, and further comprising a frame including suction feet for mounting on the side of the aircraft, wherein said polish head mounting block is mounted on said frame for movement along two axes of a plane substantially parallel to the surface of the aircraft.

8. A method of cleaning aircraft windows, comprising the steps of:

mounting the frame of a polishing machine, having a polish head, on the aircraft on top of a window;

providing pressurized air, water, and electricity to said polishing machine and turning on the machine;

mounting a kit including a plurality of polish pads on said frame;

directing the polish head of the machine to go to the kit, and using the pressurized air to provide a vacuum to the polish head, using that vacuum at the polish head to pick up the polish pad;

directing the machine to squirt water and to rotate the polish head as the polish head follows a predetermined path along the window to polish the window; and directing the machine to provide pressurized air to the polish head to eject the polish pad after the predetermined path has been completed.

9. A polishing machine for polishing aircraft windows, comprising:

a frame defining upward, downward, forward, rear, left and right directions;

a plurality of suction feet mounted to said frame and directed downwardly;

a polish head mounted on said frame and directed downwardly;

a first pressurized gas line connected to said polishing machine, through which pressurized gas is supplied to said polishing machine, said first pressurized gas line including conduits to said suction feet;

a first venturi valve in fluid communication with said first pressurized gas line, wherein, when said first venturi valve is in a first position, it provides pressurized air to said suction feet, and, when said first venturi valve is in a second position, it uses the pressurized air to create a suction at said suction feet.

10. A machine as recited in claim 9, and further comprising:

a handle for holding said machine when it is being aligned with an aircraft window; and a control mounted near said handle for controlling said first venturi valve.

11. A machine as recited in claim 10, and further comprising a cover for said control in order to prevent anyone from accidentally changing the position of said first venturi valve when said machine is operating.

12. A machine as recited in claim 9, and further comprising a second pressurized gas line, which is in fluid communication with said polish head; and a second venturi valve in fluid communication with said second pressurized gas line, wherein, when said second venturi valve is in a first position, it provides pressurized gas to said polish head to blow a polish pad away from said polish head, and, when said second venturi valve is in a second position, it creates a vacuum at said polish head, to hold a polish pad on said polish head.

13. A machine as recited in claim 12, and further comprising:

a first receptacle mounted on said frame for receiving a polish pad kit; and a sensor on said first receptacle which senses whether there is a polish pad kit in said first receptacle.

14. A machine as recited in claim 13, and further comprising:

a polish pad kit in said first receptacle, said polish pad kit including a substantially cup-shaped holder and a plurality of polish pads in said cup-shaped holder, each of said polish pads including a circular backing plate and a plurality of polish material segments adhered to said circular backing plate, said segments being spaced from each other to permit liquid and air to pass between said segments.

15. A machine as recited in claim 14, wherein the polish material segments on at least one of said polish pads are impregnated with dry polishing compound so that, when the impregnated polish pad comes into contact with water, the polishing compound is dissolved by the water, releasing the polishing compound from the impregnated polish pad.

16. A machine as recited in claim 14, wherein said cup-shaped holder includes a plurality of projections and said first receptacle includes a plurality of slots which receive said respective projections, wherein said cup-shaped holder is releasably mounted on said first receptacle by pushing the projections down, into their respective slots and rotating the cup-shaped holder relative to the receptacle.

17. A machine as recited in claim 13, and further comprising a second receptacle mounted on said frame, wherein said second receptacle is adapted to receive polish pads which have been removed from said first receptacle.

18. A polishing machine for polishing aircraft windows, comprising:

a frame defining upward, downward, forward, rear, left and right directions;

a plurality of suction feet mounted on said frame and directed downwardly;

a polish head mounted on said frame and directed downwardly;

a first pressurized gas line connected to said polishing machine, whereby pressurized gas may be supplied to said polishing machine, said first pressurized gas line including conduits to said suction feet;

a second pressurized gas line connected to said polishing machine, said second pressurized gas line in fluid communication with said polish head;

a first venturi valve in fluid communication with said first pressurized gas line, wherein, when said first venturi valve is in a first position, it provides pressurized air to said suction feet, and, when said first venturi valve is in a second position, it uses the pressurized air to create a suction at said suction feet;

a second venturi valve in fluid communication with said second pressurized gas line, wherein, when said second venturi valve is in a first position, it provides pressurized gas to blow a polish pad away from said polish head, and, when said second venturi valve is in a second position, it creates a vacuum at said suction head for holding a polish pad on said polish head;

a first step motor mounted on said frame for providing the forward-to-rearward motion of said polish head;

a second step motor mounted on said frame for providing the left-to-right motion of said polish head;

an air-operated motor mounted on said frame, said air-operated motor being mounted to rotate said polish head when pressurized air is provided to the air-operated motor; and a piston-cylinder combination mounted on said frame to raise and lower said polish head.

19. A machine as recited in claim 18, and further comprising a plurality of solenoid valves which control the flow of air to said air-operated motor and to said piston-cylinder combination; wherein said venturi valves are also solenoid valves; and an electrical control system which controls said solenoid valves and said step motors so that said polish head automatically picks up a polish pad, moves down to the surface of a window, rotates as it moves along a predetermined path to polish the window, and then ejects the polish pad.

20. A machine as recited in claim 19, and further comprising a central controller in said electrical control system, which is programmed with predetermined paths for polishing the windows of a plurality of different types of aircraft; and a selector switch on said machine for communicating with said central controller to select the type of aircraft window to be polished.

* * * * *

UNITED STATES PATENT AND TRADEMARK OFFICE
CERTIFICATE OF CORRECTION

PATENT NO : 5,964,645
DATED : October 12, 1999
INVENTOR(S): Jemt, Thomas

It is certified that error appears in the above-identified patent and that said Letters Patent is hereby corrected as shown below:

In column 2, line 18, after "Fig.3 is" insert "a".

In column 2, line 24, after "machine" insert "of".

Signed and Sealed this

Eleventh Day of April, 2000

Attest:

Attesting Officer

Q. TODD DICKINSON
*Director of Patents and Trademarks*